United States Patent
Yamaya et al.

(10) Patent No.: US 10,419,924 B2
(45) Date of Patent: Sep. 17, 2019

(54) MOBILE APPARATUS, METHOD OF CONTROLLING THE SAME, AND RECORDING MEDIUM

(71) Applicant: CASIO COMPUTER CO., LTD., Shibuya-ku, Tokyo (JP)

(72) Inventors: Takashi Yamaya, Fussa (JP); Kouichi Nakagome, Tokorozawa (JP); Keisuke Shimada, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/901,198

(22) Filed: Feb. 21, 2018

(65) Prior Publication Data
US 2018/0288609 A1 Oct. 4, 2018

(30) Foreign Application Priority Data
Mar. 31, 2017 (JP) ................. 2017-071699

(51) Int. Cl.
*H04W 8/22* (2009.01)
*H04W 68/00* (2009.01)
*H04W 4/02* (2018.01)

(52) U.S. Cl.
CPC ............... *H04W 8/22* (2013.01); *H04W 4/02* (2013.01); *H04W 68/00* (2013.01)

(58) Field of Classification Search
CPC ....... H04W 4/025; H04W 4/27; H04W 4/029; H04W 4/023; H04W 4/026; H04W 4/04; H04W 4/046; H04W 4/02; H04W 8/22; H04W 68/00
See application file for complete search history.

(56) References Cited

U.S. PATENT DOCUMENTS

| 5,446,445 A | * | 8/1995 | Bloomfield | ............ G08B 17/10 340/521 |
| 6,459,955 B1 | * | 10/2002 | Bartsch | ............ A47L 9/00 700/245 |
| 9,639,084 B2 | | 5/2017 | Nakamura et al. | |
| 2008/0086236 A1 | * | 4/2008 | Saito | ............ G01S 5/0252 700/245 |

(Continued)

FOREIGN PATENT DOCUMENTS

| JP | 07225612 A | 8/1995 |
| JP | 2008046956 A | 2/2008 |

(Continued)

*Primary Examiner* — Jean A Gelin
(74) *Attorney, Agent, or Firm* — Holtz, Holtz & Volek PC (57) ABSTRACT

A mobile apparatus according to the present embodiment includes a voice input unit configured to detect a signal from a user. In a case where the voice input unit detects a signal from the user and as a detection result of the signal from the user, it is determined that there is a signal from the user, the mobile apparatus performs sound source localization and specifies a location or direction in which the detected signal from the user is given. In a case where it is determined that the mobile apparatus is not able to move to the location where the signal from the user is given, a voice output unit configured to output a voice signal, a driving unit configured to move the mobile apparatus, and a light emitting unit configured to emit light performs predetermined control.

19 Claims, 6 Drawing Sheets

(56) References Cited

U.S. PATENT DOCUMENTS

| | | | | |
|---|---|---|---|---|
| 2009/0022368 | A1* | 1/2009 | Matsuoka | B60K 35/00 382/103 |
| 2013/0053099 | A1* | 2/2013 | Nabata | G01J 5/047 455/556.1 |
| 2013/0150004 | A1* | 6/2013 | Rosen | H04W 8/22 455/414.1 |
| 2014/0303775 | A1* | 10/2014 | Oh | G05D 1/0016 700/253 |
| 2015/0032260 | A1* | 1/2015 | Yoon | A47L 9/2857 700/257 |
| 2015/0091694 | A1* | 4/2015 | Degtyarev | A63H 17/36 340/5.51 |
| 2017/0268280 | A1* | 9/2017 | Kim | E05F 15/73 |
| 2018/0035860 | A1* | 2/2018 | Tsuboi | A47L 9/28 |

FOREIGN PATENT DOCUMENTS

| | | | |
|---|---|---|---|
| JP | 2014219723 | A | 11/2014 |
| JP | 2016048464 | A | 4/2016 |

* cited by examiner

| LIGHT EMISSION MEANS | LIGHT EMISSION CONTROL | CONTENTS OF ACTION THAT USER IS PROMPTED TO TAKE |
|---|---|---|
| LED | BLINKS IN RED | PAY ATTENTION TO MOBILE APPARATUS |
| | BLINKS IN YELLOW | MOVE TO NEAR MOBILE APPARATUS |
| | BLINKS IN GREEN | MOVE TO LOCATION WITH GOOD VISIBILITY LIKE LOCATION WITH NO OBSTACLE BETWEEN USER AND MOBILE APPARATUS |
| | LIGHTS UP IN GREEN | CALL |

MOBILE APPARATUS, METHOD OF CONTROLLING THE SAME, AND RECORDING MEDIUM

CROSS-REFERENCE TO RELATED APPLICATIONS

The present application claims priority based on Japanese Patent Application No. 2017-071699 filed on Mar. 31, 2017. All contents of the basic application are incorporated into the present application.

BACKGROUND

1. Technical Field

The present invention relates to a mobile apparatus, a method of controlling the mobile apparatus, and a recording medium.

2. Related Art

An apparatus that performs operations similar to human motions using electrical or magnetic action and move autonomously is called a mobile robot (mobile apparatus). The mobile robot performs self-localization and generates an environmental map through simultaneous localization and mapping (SLAM) using a sensor provided therein, search for a route for moving to a destination with reference to the generated environment map. JP H7-225612 A describes that a mobile robot periodically creates a new environmental map for a moving space of the mobile robot itself to update the environmental map. It is generally known that as a type of a mobile robot, there is a mobile robot having a function of moving to a direction in which a user exists (voice source direction) in a case where the mobile robot recognizes a call by a voice from the user.

SUMMARY

A mobile apparatus comprising:
a signal detector configured to detect a signal;
a specifier configured to specify a location or direction in which the signal detected by the signal detector is given;
a movement controller configured to move the mobile apparatus to the location or direction specified by the specifier;
a determiner configured to determine whether the mobile apparatus is able to move to the location where the signal is given by the movement controller; and
a controller configured to perform predetermined control in a case where the determiner determines that the mobile apparatus is not able to move.

A method of controlling a mobile apparatus, the method comprising:
detecting a signal;
specifying a location or direction in which the signal detected by the detecting is given;
controlling a movement to move the mobile apparatus to the location or direction specified by the specifying;
determining whether the mobile apparatus is able to move by the controlling to the location where the signal is given; and
performing predetermined control in a case where the determining determines that the mobile apparatus is not able to move.

A non-transitory computer-readable storage medium having stored thereon a program executable by a computer of a device, which comprises, the program controlling the computer to perform functions comprising: detecting a signal;
specifying a location or direction in which the detected signal is given;
controlling a movement to move the mobile apparatus to the specified location or direction;
determining whether it is possible to move to the location where the signal is given; and
performing predetermined control in a case where the determining determines that the mobile apparatus is not able to move.

A deeper understanding of the present application can be obtained if the following detailed description is considered together with the following drawings.

DETAILED DESCRIPTION

Hereinafter, a mobile apparatus according to an embodiment of the present invention will be described with reference to the drawings. Note that the mobile apparatus according to the present invention will be described below as being an apparatus that generates an environment map from a detection result of a distance sensor or the like and searches for a movement route of the mobile apparatus moves on the basis of the environment map.

Figure 1:
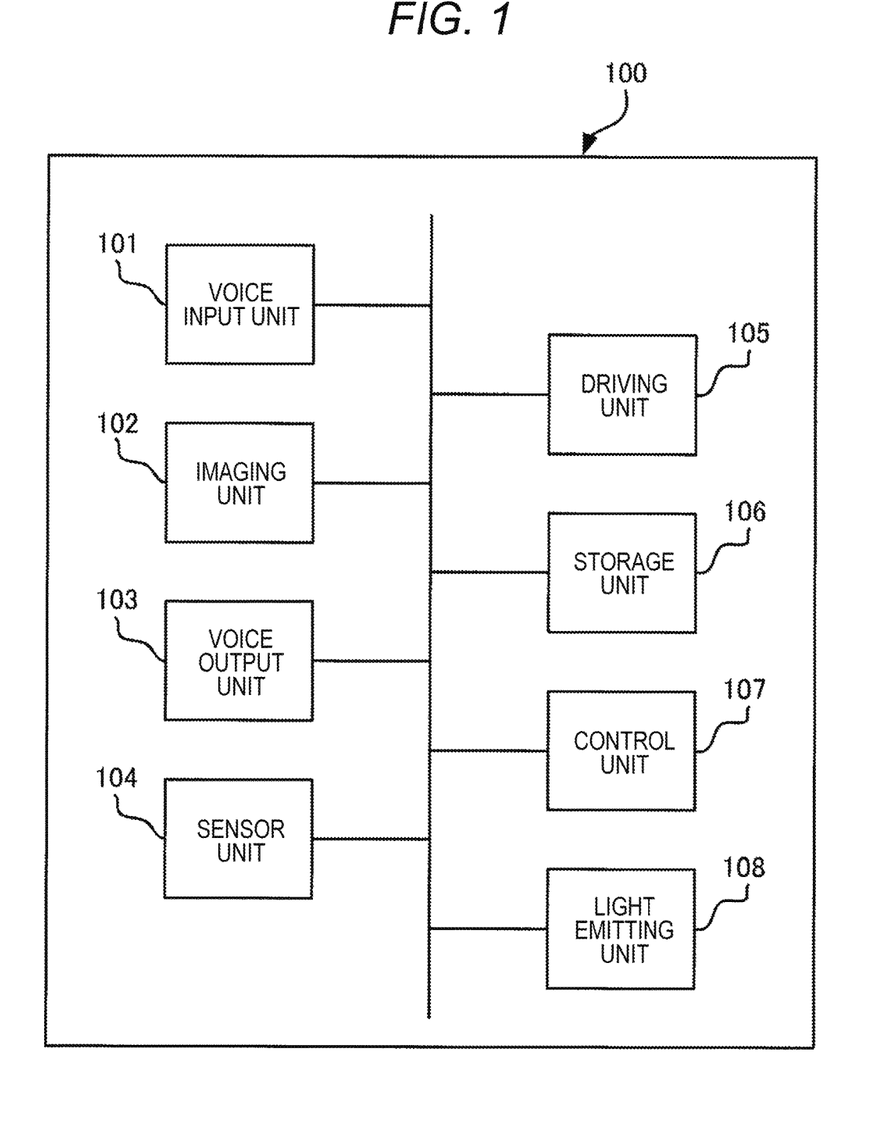
FIG. 1 is a block diagram illustrating an exemplary schematic configuration of a mobile apparatus according to an embodiment to which the present invention is applied.

FIG. 1 is a block diagram illustrating a configuration of the mobile apparatus 100. As illustrated in FIG. 1, the mobile apparatus 100 includes a voice input unit 101, an imaging unit 102, a voice output unit 103, a sensor unit 104, a driving unit 105, a storage unit 106, a control unit 107, and a light emitting unit 108.

Figure 2:
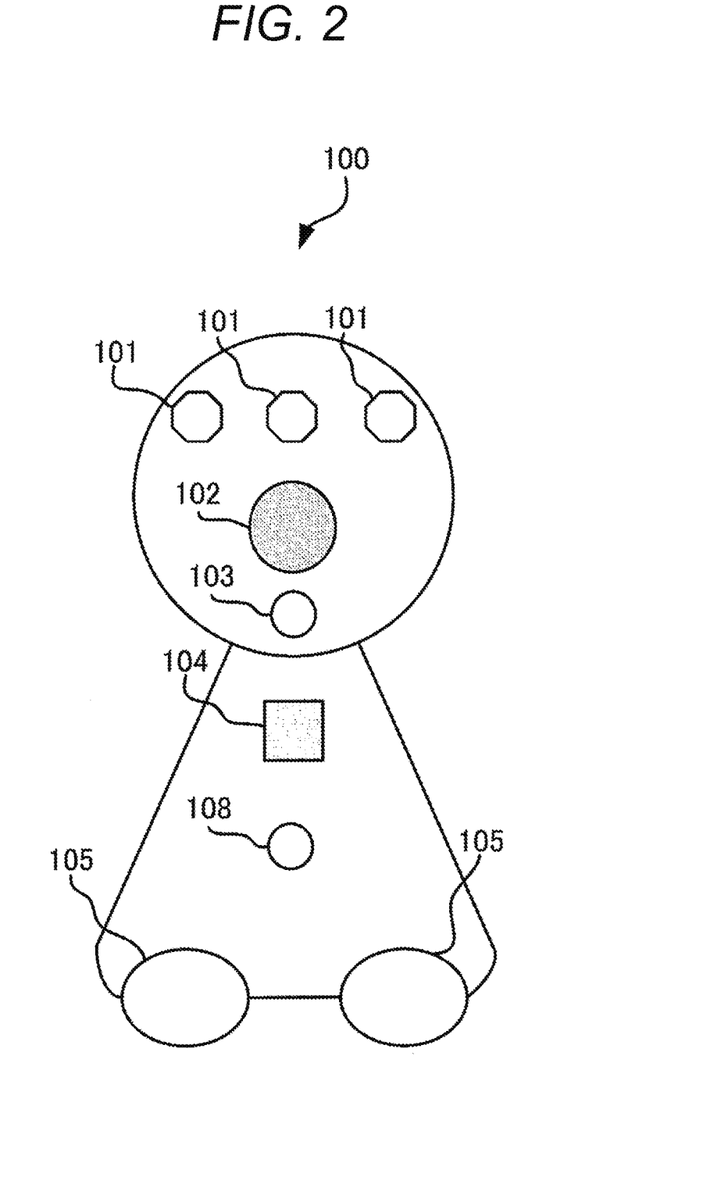
FIG. 2 is an external view illustrating an exemplary external appearance of the mobile apparatus according to the embodiment to which the present invention is applied.

Furthermore, FIG. 2 is a diagram illustrating an overall view of the mobile apparatus 100. As illustrated in FIG. 2, the mobile apparatus 100 includes the voice input unit 101, the imaging unit 102, the voice output unit 103, the sensor unit 104, the driving unit 105, and the light emitting unit 108 in FIG. 1.

The voice input unit 101 includes, for example, a plurality of analog-to-digital (AD) converters, microphones, and acquires ambient sound as a voice signal.

The imaging unit 102 captures an image of a user who is an object and generates a captured image. Although not illustrated, the imaging unit 102 includes a camera including an optical system and an imaging element, and an imaging control unit that controls the camera. The imaging element is an image sensor such as a charge coupled device (CCD) and a complementary metal-oxide semiconductor (CMOS). The imaging element converts an optical image passed through the optical system into a two-dimensional image signal.

The voice output unit 103 includes, for example, a digital-to-analog (DA) converter, an amplifier, and a speaker, is configured to convert a voice signal into an analog voice output signal, and outputs a voice from the speaker.

The sensor unit 104 is configured to acquire information indicating an external state of the mobile apparatus 100, convert the information into a predetermined signal appropriately, and supply the converted signal to the control unit 107. The sensor unit 104 includes, for example, an acceleration sensor, an angular velocity sensor, a distance sensor, and a human sensor.

The driving unit 105 is a part for moving the mobile apparatus 100. The driving unit 105 includes left and right wheels provided on a bottom surface of the mobile apparatus 100, a motor configured to rotationally drive the left and right wheels, and a drive circuit configured to drive and control the motor. In accordance with the control signal from the control unit 107, the drive circuit is configured to supply a drive pulse signal to the motor. The motor is configured to rotate the right and left wheels in accordance with the driving pulse signal and move the mobile apparatus 100. In this manner, the driving unit 105 functions as a moving unit configured to move the mobile apparatus 100. Note that the number of motors is any number as long as the left and right wheels are configured to independently rotate and the mobile apparatus 100 can perform traveling such as traveling forward, traveling backward, turning, acceleration, and deceleration. For example, a coupling mechanism and a steering mechanism may be provided, and the left and right wheels may be driven by one motor. Furthermore, the number of drive circuits can be appropriately changed according to the number of motors.

The storage unit 106 includes, for example, a hard disk drive (HDD), a solid-state drive (SSD), an electrically erasable programmable read only memory (EEPROM), and a flash memory.

The storage unit 106 is configured to store a system program executed by the control unit 107, a processing program for executing various processes, data necessary for executing these programs, and the like.

The control unit 107 is configured to control the overall operation of the mobile apparatus 100. The control unit 107 includes a microcomputer including a processor and a random-access memory (RAM). The control unit 107 is configured to reading the system program and the application program stored in the storage unit 106 and executing these programs on the RAM, thereby controlling each part of the mobile apparatus 100. In this manner, the control unit 107 functions as a controller.

The light emitting unit 108 includes a light emitting diode (LED), a laser diode (LD), a liquid crystal display (LCD), and the like. The light emitting unit 108 is attached to, for example, a surface portion of the mobile apparatus 100, and is configured to emit light under the control of the control unit 107. Furthermore, the light emitting unit 108 may include a plurality of LEDs, LDs, LCDs, and the like.

On the basis of the system program and the application program stored in the storage unit 106, the control unit 107 is configured to generate a control signal for moving the mobile apparatus 100 in accordance with various data obtained from the sensor unit 104, for example, and transmit the generated control signal to the driving unit 105, thereby controlling the movement operation of the mobile apparatus 100.

First Embodiment

Next, the operation of a mobile apparatus 100 in the present embodiment will be described with reference to a flowchart illustrated in FIG. 3. A control unit 107 starts the process of the flowchart illustrated in FIG. 3 in response to the turning on of the mobile apparatus 100 by a predetermined operation.

Figure 3:
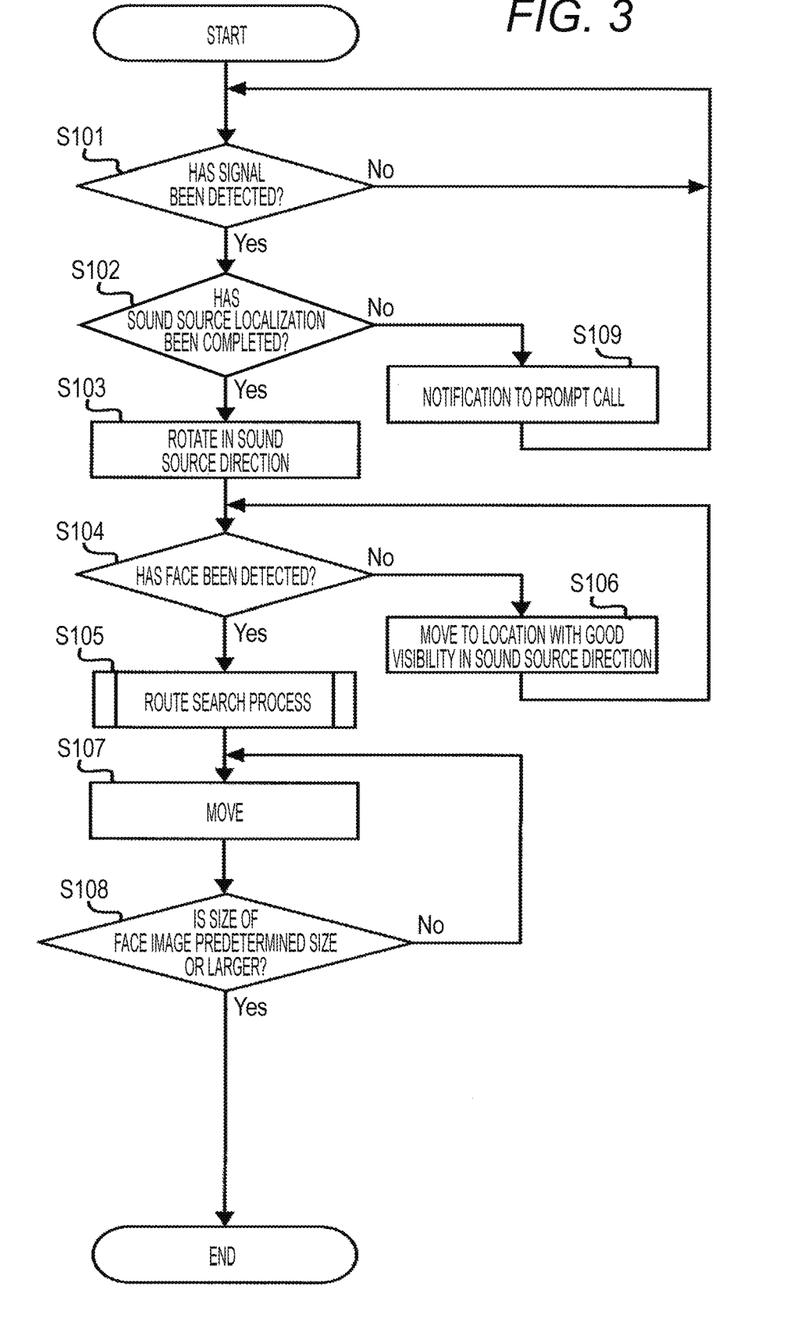
FIG. 3 is a flowchart illustrating an exemplary operation process of the mobile apparatus according to an embodiment to which the present invention is applied.

As illustrated in FIG. 3, first, the control unit 107 detects a signal from a user from a voice signal obtained by a voice input unit 101 (step S101). An example of a signal from the user includes a voice of a call produced from the user's mouth and sound produced by a motion such as the user's clapping hands.

Then, the control unit 107 calculates a direction angle at which the signal (voice and sound) detected in step S101 arrives and performs sound source localization for estimating a sound source direction in which the user exists, whereby the control unit 107 specifies a location or direction in which the detected signal is given (step S102). As a method of the sound source localization, for example, multiple signal classification (MUIC) can be used to estimate the position, location and direction of a sound source, but a known technique is used. Therefore, detailed description of the method will be omitted.

Next, in a case where the sound source localization has been completed in step S102 (step S102: YES), the control unit 107 calculates an angle value for driving a driving unit 105 in order to cause an imaging unit 102 to directly face a sound source direction in which the user is estimated to exist, from the arrival direction angle of the voice signal calculated in step S102. On the basis of the angle value, the control unit 107 drives the driving unit 105 to rotate the mobile apparatus 100 in the sound source direction (step S103).

Next, after rotating the mobile apparatus 100 in the sound source direction, the control unit 107 determines whether a face area has been detected from a captured image obtained by imaging by the imaging unit 102. Specifically, it is determined whether face feature data is included in the captured image (step S104).

Next, the control unit 107 performs a route search process (step S105) in a case where a specified value or more of the face feature data is detected from the captured image, that is, in a case where a face is detected (step S104: YES).

Figure 5:
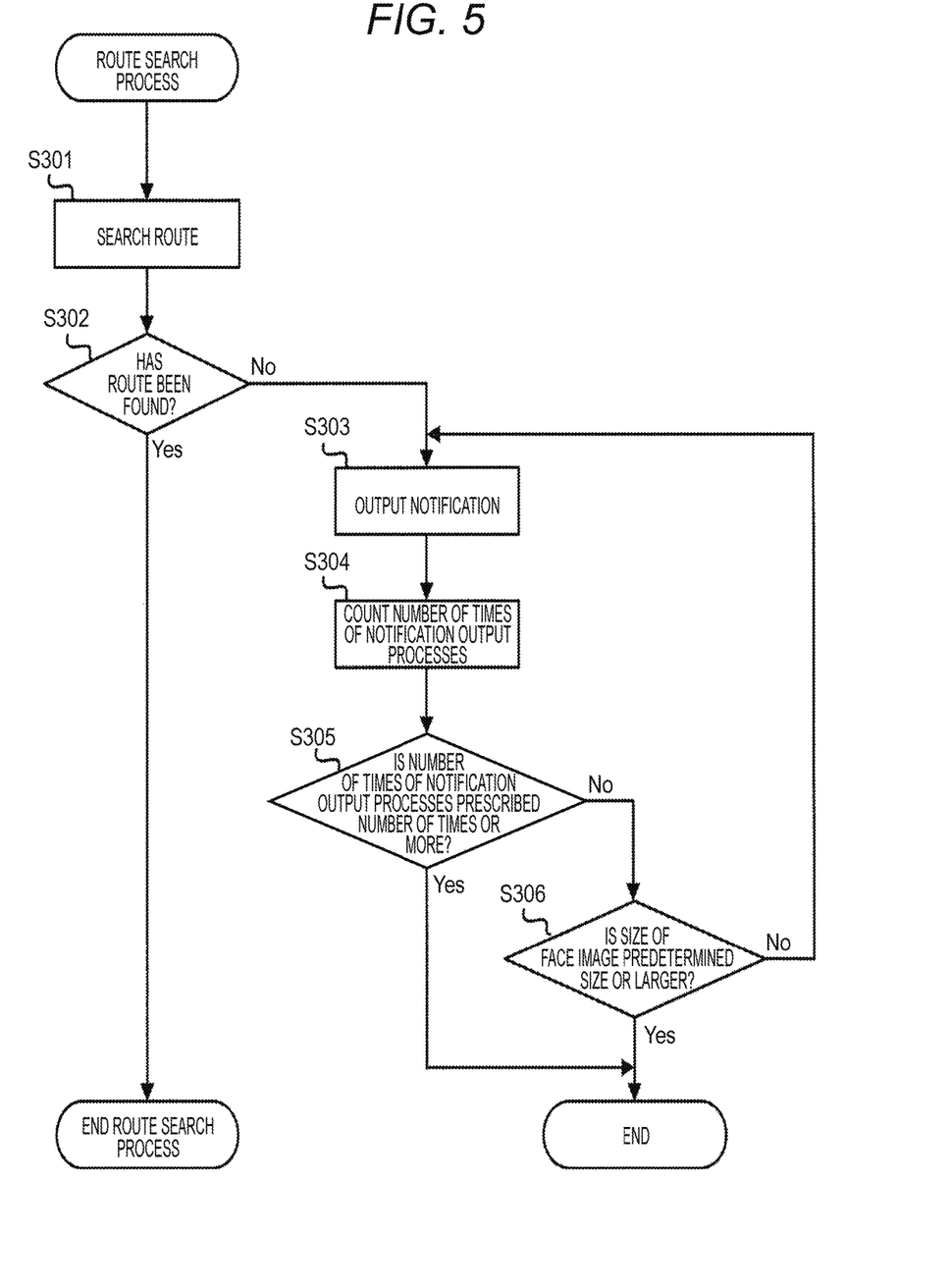
FIG. 5 is a flowchart illustrating an exemplary route search process of the mobile apparatus according to the embodiment of the present invention.

Next, the route search process in FIG. 5 will be described. First, using created map information, the control unit 107 searches for a route for moving from an own apparatus position to the sound source direction where the user exists (step S301). Estimation of the own apparatus position uses a known technique of estimating the own apparatus position using a captured image and a map created by the SLAM method. Therefore, detailed description thereof will be omitted.

Next, the control unit 107 determines whether a movement route on which the mobile apparatus 100 can move a certain distance or longer is found (step S302). The control unit 107 determines whether a movement route on which the mobile apparatus 100 can move a certain distance or longer is found, that is, whether there is a step that makes it unable for the mobile apparatus 100 to move. In a case where there is no step, the control unit 107 determines that a movement route has been found (step S302: YES), and ends the route search process.

Meanwhile, the control unit 107 determines whether a movement route on which the mobile apparatus 100 can move a certain distance or longer is found, that is, whether there is a step that makes it unable for the mobile apparatus 100 to move. In a case where the control unit 107 determines that there is the step, the control unit 107 determines that a movement route has not been found (Step S302: NO) and performs a predetermined notification (step S303).

Next, the control unit 107 counts the number of times of notification output processes in step S303, and stores a count result in the storage unit (step S304). The predetermined notification means a notification to prompt the user to take a predetermined action. The prescribed notification is a notification by a voice output from a voice output unit 103 of the mobile apparatus 100, for example, by a call to have the user pay attention to the mobile apparatus 100, by a call to prompt the user to move to near the mobile apparatus 100, and by a call to prompt the user to move to a location with good visibility like a location with no obstacle between the user and the mobile apparatus 100, a notification by operating and moving each part of the mobile apparatus 100, for example, by an operation to have the user pay attention to the mobile apparatus 100, by an operation to prompt the user to move near the mobile apparatus 100, and by an operation to prompt to the user to move to the location with good visibility like a location with no obstacle between the user and the mobile apparatus 100, and a notification by causing the light emitting unit 108 to emit light, for example, by light emission to have the user pay attention to the mobile apparatus 100, by light emission to prompt the user to move near the mobile apparatus 100, and by light emission to prompt to the user to move to the location with good visibility like a location with no obstacle between the user and the mobile apparatus 100. As illustrated in an action table of FIG. 6, for the notification by light emission, contents of a light emitter, light emission control, and an action that the user is prompted to take may be defined in advance, and the user may recognize the contents of the notification from the mobile apparatus 100 in accordance with this action table. For example, in a case where the light emitter of the light emitting unit is an LED, if the light emission of the LED blinks in yellow, an action that the mobile apparatus 100 prompts the user is to "move to near the mobile apparatus."

Note that each of the predetermined notifications does not need to be separately performed, but the notifications may be performed in combination. For example, a call to prompt the user to move near the mobile apparatus 100 by a voice output from the voice output unit 103 of the mobile apparatus 100, and operation to prompt the user to move near the mobile apparatus 100 by operating and moving each part of the mobile apparatus 100 are executed in combination. As a result, there is obtained an effect that the user more easily recognizes the notification from the mobile apparatus 100.

Next, the control unit 107 acquires from the storage unit a count result of the number of times of notification output processes. In a case where the obtained result shows that the notification output process has been a predetermined number of times or more (step S305: YES), the process ends.

On the other hand, the control unit 107 acquires from the storage unit the count result of the number of times of notification output processes. In a case where the obtained result shows that notification output process has not been performed the predetermined number of times or more (step S305: NO), the process proceeds to step S306, and subsequent processes are performed.

Next, the control unit 107 detects a face area from a captured image captured by the imaging unit 102, extracts facial feature data, performs face detection, and determines whether the size of a face image is a predetermined size or larger. In a case where the size of the calculated face image is the predetermined size or larger (step S306: YES), the process ends.

On the other hand, the control unit 107 detects a face area from the captured image captured by the imaging unit 102, extracts facial feature data, performs face detection, and determines whether the size of the facial image is the predetermined size or larger. In a case where the size of the calculated face image is the predetermined size or smaller (step S306: NO), the process returns to step S303, and the subsequent processes are repeated.

Returning to step S102 in FIG. 3, description will continue.

Figure 6:
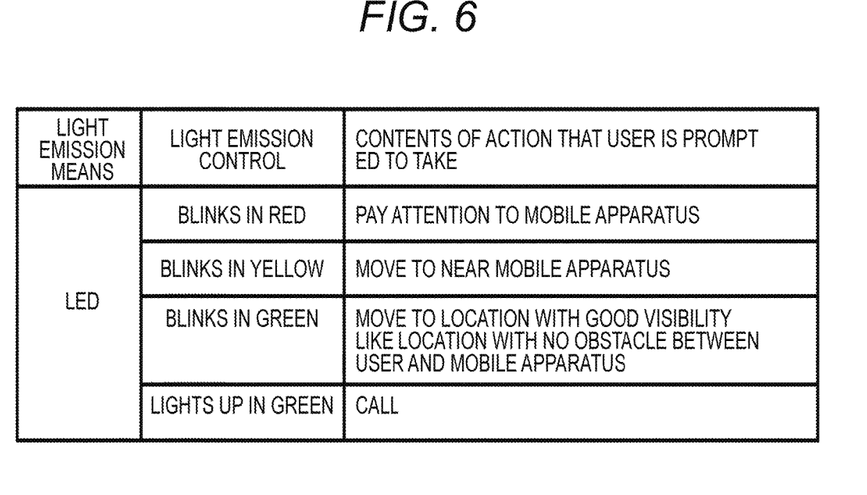
FIG. 6 illustrates an exemplary action table of the mobile apparatus according to the embodiment to which the present invention is applied.

In a case where the control unit 107 has not been able to perform the sound source localization in step S102 (step S102: NO), the control unit 107 performs the predetermined notification to the user (step S109). The predetermined notification is a notification to prompt a call from the user and prompts the user to call by a voice. The notification to prompt a call means a notification by a voice outputted from the voice output unit 103 of the mobile apparatus 100, a notification by operating and moving each part of the mobile apparatus 100, and a notification by causing the light emitting unit 108 to emit light. Note that each of the predetermined notifications need not be independently performed, but the notifications may be performed in combination. For example, a notification by a voice output from the voice output unit 103 of the mobile apparatus 100 and a notification by causing the light emitting unit 108 to emit light are executed in combination. This makes it possible to obtain the effect that the user more easily recognizes the notification from the mobile apparatus 100. As illustrated in FIG. 6, for example, in the case where the light emitter of the light emitting unit is an LED, in a case where the light emission of the LED lights up in green, this indicates that the action that the mobile apparatus 100 prompts the user is to "call."

Returning to step S107 in FIG. 3, description will continue.

After the route search process, the control unit 107 drives the driving unit 105 to move the mobile apparatus 100 in the sound source direction (step S107).

Next, the control unit 107 calculates the size of the face image from the extracted face feature data. It is determined whether the calculated size of the face image is a predetermined size or larger (step S108). The calculation of the size of the face image uses a method of calculating the size of the face image in consideration of the size of the face image with respect to an angle of view of the captured image on the basis of various settings in the imaging unit 102. However, the method of calculating the size of the face image is not limited to this method, and other methods may be used. Furthermore, the predetermined size is the size of the face image in a case where a distance at which a distance between the mobile apparatus 100 and the user becomes shorter than a certain distance, and the user can optionally set the certain distance. In a case where the size of the calculated face image is the predetermined size or larger (step S108: YES), the operation of the mobile apparatus 100 in the present embodiment is ended.

On the other hand, the control unit 107 calculates the size of the face image from the extracted face feature data, determines whether the size of the calculated face image is a predetermined size or larger, and determines whether the calculated the size of the face image is the predetermined size or smaller (step S108: NO), the process returns to step S107, and subsequent processes are repeated.

Returning to step S104, description will continue.

In the face detection in step S104, in a case where the control unit 107 does not detect a specified value or more of the face feature data from the captured image, that is, in a case where no face is detected (step S104: NO), the control unit 107 refers to previously created map information of a space where the mobile apparatus 100 exists. On the basis of the map information, the mobile apparatus 100 is moved to a location where there is no obstacle between the mobile apparatus 100 and the location in which the signal is given that is obtained in step S102 or a position with visibility in the sound source direction such as a location away at a certain distance or longer from an obstacle even if there is the obstacle (step S106). Then, the process returns to step S104, and subsequent processes are repeated.

Modified Example of First Embodiment

Figure 4:
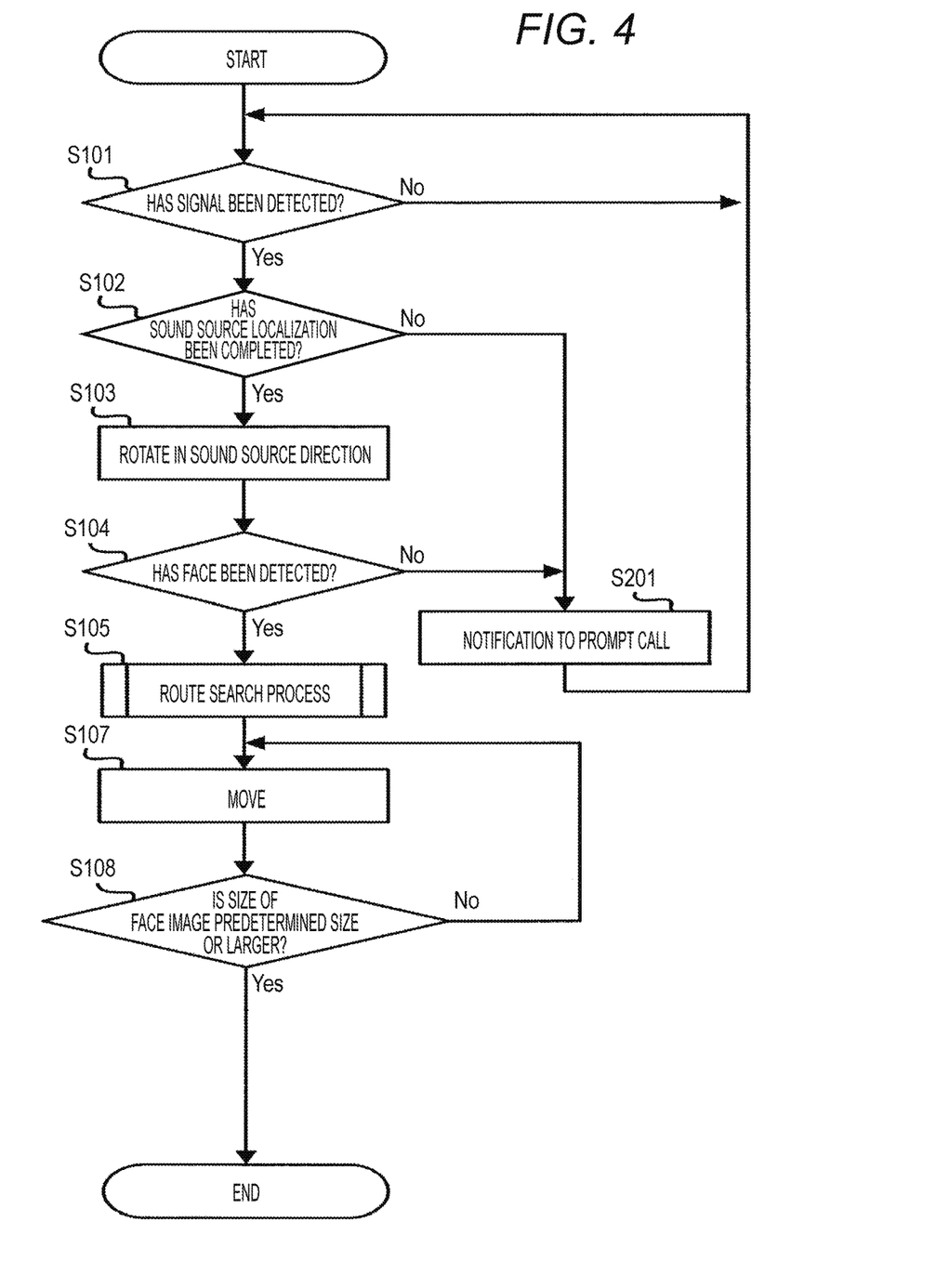
FIG. 4 is a flowchart illustrating a modified example of an operation process of the mobile apparatus according to the embodiment to which the present invention is applied.

Next, a modified example of the first embodiment will be described with reference to FIG. 4.

In a case where a control unit 107 has not been able to perform sound source localization in step S102 (step S102: NO), the control unit 107 performs a notification to prompt a call from the user to prompt a call by a voice from the user (step S201).

Furthermore, in the face detection in step S104, in a case where the control unit 107 does not detect the specified value or more of the face feature data from the captured image, that is in a case where no face is detected (step S104: NO), the control unit 107 perform a notification to prompt a call by a voice from the user (step S201). Then, the control unit 107 returns to step S101 and repeats subsequent processes.

As described above, in a case where a mobile apparatus 100 according to the present embodiment detects a signal and determines that there is a signal, the mobile apparatus specifies a location or direction in which the signal is given. Then, in a case where the mobile apparatus 100 has not been able to move to the location or direction in which the signal is given, predetermined control is performed. Therefore, in a case where the mobile apparatus 100 is not able to move to the location from which the signal is given, predetermined control is performed, whereby trouble caused by the mobile apparatus 100 not being able to approach a destination can be solved.

Furthermore, the mobile apparatus 100 according to the present embodiment is provided with a notifier, and performs a predetermined notification in a case where the mobile apparatus 100 is not able to move. Therefore, it is possible to solve trouble caused by the mobile apparatus 100 not able to approach a destination.

Furthermore, in the mobile apparatus 100 according to the present embodiment, the mobile apparatus 100 performs a notification to prompt the user to make a call. Therefore, it is possible to solve trouble caused by the mobile apparatus 100 not being able to approach the destination.

Furthermore, the mobile apparatus 100 according to the present embodiment includes a searcher, search for a movement route to a location or direction specified by a specifier, and a case where the searcher is not able to search for the movement route to the location or direction specified by the specifier is included. Therefore, it is possible to solve trouble caused by the mobile apparatus 100 not being able to approach the destination.

Furthermore, in the mobile apparatus 100 according to the present embodiment, a case where a specifier has not been able to specify a location or direction from which the signal is given is included, it is possible to solve trouble caused by the mobile apparatus 100 not being able to approach the destination.

Furthermore, the mobile apparatus 100 according to the present embodiment includes a face detector and performs control on the basis of a face detection result by the face detector. Therefore, it is possible to solve trouble caused by the mobile apparatus 100 not being able to approach the destination.

Furthermore, the mobile apparatus 100 according to the present embodiment includes an attention determiner, and the attention determiner determines whether the face detected on the basis of a face detection result is directed to the mobile apparatus 100. Therefore, it is possible to solve trouble caused by the mobile apparatus 100 not being able to approach the destination.

In addition, in a case where the mobile apparatus 100 according to the present embodiment is not able to move by the movement controller, the mobile apparatus 100 moves to a position with good visibility toward the location or direction specified by the specifier. Therefore, it is possible to solve trouble caused by the mobile apparatus 100 not being able to approach the destination.

Furthermore, the mobile apparatus 100 according to the present embodiment includes a notification count determiner that determines the number of times of notifications by the notifier, and the mobile apparatus 100 is controlled on the basis of a determination result of the number of times of notifications. Therefore, it is possible to solve trouble caused by the mobile apparatus 100 not being able to approach the destination.

Note that although the mobile apparatus 100 performs a notification by a call to prompt the user to come to a location where the mobile apparatus 100 is positioned, the mobile apparatus 100 may perform an operation to rotate the mobile apparatus 100 by controlling the driving unit 105, and may perform an operation that the mobile apparatus 100 seems to be searching for the user, such as repeating rotation in the left direction and rotation in the right direction.

Note that the mobile apparatus 100 determines the signal from the user to the mobile apparatus 100, but the mobile apparatus 100 may calculate the reliability of the signal from the user, if the calculated reliability is equal to or greater than a predetermined threshold, it is recognized that the signal is a signal from the user, and if the calculated reliability is equal to or less than the predetermined threshold value, the process may return to signal detection.

Note that the mobile apparatus 100 determines the number of times of notifications by the notifier from the mobile apparatus 100 to the user, but if the number of times of notifications is less than the predetermined number of times, the mobile apparatus 100 may perform a response to have the user come, and if the number of times of repetition is the predetermined number of times or more, the mobile apparatus 100 may not perform a response to have the user come. Furthermore, if the number of times of notifications is the predetermined number of times or more, the mobile apparatus 100 may increase the volume of the voice of a signal as a call to have the user come to the location where the mobile apparatus 100 is positioned, and the type of words of the call may be changed, and the words of the call may be produced consecutively. Furthermore, if the number of times of notifications is the predetermined number of times or more, the strength of notification operation to request the user to tell where the user is positioned may be increased.

In a case where the mobile apparatus 100 moves in the sound source direction, it may be confirmed whether the user exists by using the human sensor of a sensor unit 104. Note that in a case where the mobile apparatus 100 moves to the sound source direction, if the mobile apparatus 100 confirms an obstacle with a human sensor of the sensor unit 104 and becomes unable to move to the sound source direction before confirming the existence of the user, the mobile apparatus 100 may perform a notification to prompt the user to call.

Note that the signal detected in step S101 is a voice or sound, but the signal is not limited thereto. For the signal from the user, the user's gesture accompanying his/her motion or light emission by a light emitting device such as a light emitting diode (LED) may be used as a signal. In this case, the signal may be recognized from an imaging result obtained by an imaging unit 102 instead of the sound source localization in step S102.

In the face detection in step S104, in a case where the specified value or more of the face feature data is not detected from the captured image, the mobile apparatus 100 performs a notification to prompt the user to move to a position with good visibility in the sound source direction and a notification to prompt a call from the user. However, in a case where sound source localization by sound and route search as well as the face detection have not been able to be performed, the mobile apparatus 100 may perform the notification.

Furthermore, the program to be executed in the above embodiment may be stored and distributed in a computer readable recording such as a flexible disk, a compact disc read-only memory (CD-ROM), a digital versatile disc (DVD), and a magneto-optical disc (MO), and installed, thereby constituting a system for executing the above process.

Furthermore, the program may be stored in a disk device or the like owned by a predetermined server on a network (NW) such as the Internet, and then, for example, superimposed on a carrier wave and downloaded.

Note that for example, in a case where the above-described functions are achieved in a manner of sharing with by an operating system (OS) or in cooperation with the OS and the application, only portions other than the OS may be stored and distributed in a medium or may be downloaded, for example.

The preferred embodiments of the present invention have been described above. However, the present invention is not limited to the specific embodiments, and the present invention includes the inventions described in the claims and the equivalent scope thereof.

What is claimed is:

1. A mobile apparatus comprising:
a signal detector configured to detect a signal from a user;
a specifier configured to specify a location or direction in which the signal detected by the signal detector is given as a location or direction in which the user exists;
a movement controller configured to move the mobile apparatus to the location or direction in which the user exists specified by the specifier;
an imager;
a face detector configured to detect a face of the user from a captured image captured by the imager;
a first determiner configured to determine whether the mobile apparatus is able to move to the location or direction in which the user exists by the movement controller;
a second determiner configured to determine whether the face of the user is detected by the face detector; and
a controller configured to perform predetermined control for enabling the mobile apparatus and the user to move closer to each other in a case where the second determiner determines that the face of the user is detected and the first determiner determines that the mobile apparatus is not able to move to the location or direction in which the user exists.

2. The mobile apparatus according to claim 1, further comprising a notifier,
wherein, in a case where the second determiner determines that the face of the user is detected and the first determiner determines that the mobile apparatus is not able to move to the location or direction in which the user exists, the controller performs a predetermined notification by controlling the notifier by the predetermined control.

3. The mobile apparatus according to claim 2, wherein, in a case where the second determiner determines that the face of the user is not detected, a notification by which the mobile apparatus prompts the user to call is performed by controlling the notifier to enable the mobile apparatus to move closer to the user.

4. The mobile apparatus according to claim 2, wherein the notifier comprises a voice outputter capable of outputting a voice, and
wherein the predetermined notification comprises a voice output to the user by control of the voice outputter by the predetermined control.

5. The mobile apparatus according to claim 2, wherein each part of the mobile apparatus is operable as the notifier, and
wherein the predetermined notification comprises an operation performed for the user by control of each part of the mobile apparatus by the predetermined control.

6. The mobile apparatus according to claim 2, wherein the notifier comprises a light emitter capable of emitting light, and
wherein the predetermined notification comprises light emission by the light emitter performed for the user by control of the light emitter by the predetermined control.

7. The mobile apparatus according to claim 2, wherein the predetermined notification comprises a notification performed for the user by performing the predetermined control, the notification being a notification to prompt the user to take a predetermined action.

8. The mobile apparatus according to claim 2, wherein the notifier comprises a voice outputter capable of outputting a voice, and
wherein the predetermined notification comprises a call performed for the user by control of the voice output from the voice outputter by the predetermined control in the case where the second determiner determines that the face of the user is detected and the first determiner determines that the mobile apparatus is not able to move to the location or direction in which the user exists, the call being one of (i) a call to prompt the user to move near the mobile apparatus from the location or direction in which the user exists, and (ii) a call to prompt the user to move from the location or direction in which the user exists to a location where there is no obstacle between the user and the mobile apparatus.

9. The mobile apparatus according to claim 2, wherein each part of the mobile apparatus is operable as the notifier, and wherein the predetermined notification comprises an operation performed for the user by control of each part of the mobile apparatus by the predetermined control in the case where the second determiner determines that the face of the user is detected and the first determiner determines that the mobile apparatus is not able to move to the location or direction in which the user exists, the operation being one of (i) an operation to prompt the user to move near the mobile apparatus from the location or direction in which the user exists, and (ii) an operation to prompt the user to move from the location or direction in which the user exists to a location where there is no obstacle between the user and the mobile apparatus.

10. The mobile apparatus according to claim 2, wherein the notifier comprises a light emitter, and wherein, in the case where the second determiner determines that the face of the user is detected and the first determiner determines that the mobile apparatus is not able to move to the location or direction in which the user exists, the predetermined notification comprises one of (i) light emission outputted to the user by control of the light emitter by the predetermined control to prompt the user to move near the mobile apparatus from the location or direction in which the user exists, and (ii) light emission outputted to the user by control of the light emitter by the predetermined control to prompt the user to move from the location or direction in which the user exists to a location where there is no obstacle between the user and the mobile apparatus.

11. The mobile apparatus according to claim 2, further comprising a notification count determiner configured to determine a number of times of notifications by the notifier, wherein the controller controls the mobile apparatus based on a determination result by the notification count determiner.

12. The mobile apparatus according to claim 1, further comprising a searcher configured to search for a movement route to the location or direction in which the user exists specified by the specifier, wherein the first determiner determines that the mobile apparatus is not able to move to the location or direction in which the user exists by the movement controller in a case where the searcher is not able to find a movement route to the location or direction in which the user exists specified by the specifier.

13. The mobile apparatus according to claim 1, wherein the first determiner determines that the mobile apparatus is not able to move to the location or direction in which the user exists by the movement controller in a case where the specifier is unable to specify the location or direction in which the user exists.

14. The mobile apparatus according to claim 1, further comprising a searcher configured to search for a movement route to the location or direction in which the user exists specified by the specifier, wherein, in the case where the second determiner determines that the face of the user is detected and the first determiner determines that the mobile apparatus is not able to move to the location or direction where the user exists, the controller moves the mobile apparatus to a position at which the mobile apparatus can more easily view the location or direction where the user exists by performing the predetermined control.

15. The mobile apparatus according to claim 1, wherein the first determiner determines whether a movement route, on which the mobile apparatus is able to move a certain distance or longer to the location or direction in which the user exists, is found.

16. A method of controlling a mobile apparatus, the method comprising:

detecting a signal from a user;

specifying a location or direction in which the signal detected by the detecting is given as a location or direction in which the user exists;

controlling a movement to move the mobile apparatus to the location or direction in which the user exists specified by the specifying;

performing imaging;

detecting a face of the user from a captured image captured by the imaging;

determining whether the mobile apparatus is able to move, by the controlling, to the location or direction in which the user exists;

determining whether the face of the user is detected by the detecting; and performing predetermined control for enabling the mobile apparatus and the user to move closer to each other in a case where it is determined that the face of the user is detected by the detecting and that the mobile apparatus is not able to move to the location or direction in which the user exists.

17. A non-transitory computer-readable storage medium having stored thereon a program executable by a computer of a mobile apparatus, the program controlling the computer to perform functions comprising:

detecting a signal from a user;

specifying a location or direction in which the detected signal is given as a location or direction in which the user exists;

controlling a movement to move the mobile apparatus to the specified location or direction in which the user exists;

performing imaging;

detecting a face of the user from a captured image captured by performing the imaging;

determining whether it is possible for the mobile apparatus to move to the location or direction in which the user exists;

determining whether the face of the user is detected by the detecting; and performing predetermined control for enabling the mobile apparatus and the user to move closer to each other in a case where it is determined that the face of the user is detected by the detecting and that it is not possible for the mobile apparatus to move to the location or direction in which the user exists.

18. The mobile apparatus according to claim 1, wherein the second determiner determines that the face of the user is detected in a case where a specified value or more of feature data of the face of the user is detected by the face detector.

19. The mobile apparatus according to claim 1, wherein the controller performs the predetermined control in the case where the second determiner determines that the face of the user is detected and the first determiner determines that the mobile apparatus is not able to move to the location or direction in which the user exists, and in a case where the second determiner determines that the face of the user is not detected.

* * * * *